Feb. 15, 1938.  W. L. LAWSON  2,108,717
CAMERA BELLOWS
Filed Nov. 26, 1935  2 Sheets-Sheet 1

INVENTOR
WILLIAM L. LAWSON
BY
ATTORNEY

Feb. 15, 1938. W. L. LAWSON 2,108,717
CAMERA BELLOWS
Filed Nov. 26, 1935   2 Sheets-Sheet 2

INVENTOR
*WILLIAM L. LAWSON*
BY *W. Philip Churchill*
ATTORNEY

Patented Feb. 15, 1938

2,108,717

UNITED STATES PATENT OFFICE 2,108,717

CAMERA BELLOWS

William L. Lawson, Brooklyn, N. Y.

Application November 26, 1935, Serial No. 51,558

6 Claims. (Cl. 95—39)

This invention relates to a bellows, and more particularly to a bellows suitable for use in cameras. Camera bellows to be satisfactory must meet very exacting requirements and it has been heretofore necessary to make them from multi-ply materials, usually including an outer layer of some material such as leather, intermediate strips of paper, and a suitable lining material.

One customary manner of making camera bellows, for example, is to cement strips of paper between a sheet of a covering material, as leather, and a sheet of a lining material such as rubberized cloth. This composite strip or sheet is then punched and/or scored and suitably folded to form the desired bellows. It has also been suggested to reticulate the intermediate sheet of paper to leave openings along certain lines for folding. With such a bellows, the paper is employed to lend a needed stiffness to the side walls or panels so that upon collapsing, the bellows will fold along definite predetermined lines without intermediate buckling. The lining material is usually one which may be given a dull or non-reflective finish and is employed to render the bellows light-impervious, since even pinhole leaks will render the bellows useless for photographic work. The covering material is ordinarily employed for appearance and protection. Such a material is costly to make and fashion and has several other disadvantages. For example, it is necessary to make up the composite sheet and perform at least two punching or stamping operations before the bellows material is ready to be folded and incorporated in the camera. Such bellows are also thick-walled and occupy considerable space, which is a very important consideration in folding cameras.

By my invention, satisfactory bellows may be made of a single thickness of a material having the advantageous qualities of the combined three layers of the usual camera bellows. Such material is sufficiently flexible to withstand continued flexing and weathering without producing cracks or pinholes. The material also is provided with sufficient stiffness to overcome any tendency of the formed bellows to fold except on the predetermined lines. In addition, this material is impervious to light rays affecting photographic films.

It is, therefore, one object of my invention to provide a bellows having the above qualities which is made from an integral thin sheet of material.

Another object of this invention is to provide a bellows impervious to light rays affecting photographic film and of the requisite stiffness, durability, and appearance.

A further object of my invention is to provide a camera bellows made from an impregnated sheet of fibres bound together with an elastic and adhesive binding agent.

Camera bellows of the customary truncated pyramid shape may be readily and easily made from a single sheet blank by simply stamping out the blank in one operation and folding the same along appropriate scorings or markings. My invention is not, however, limited to bellows of this shape or made in this manner and this type of bellows has been selected as exemplary because it is particularly useful in folding cameras of the usual type. This feature of my invention may be more readily understood by reference to the accompanying drawings, in which.

Figure 2:
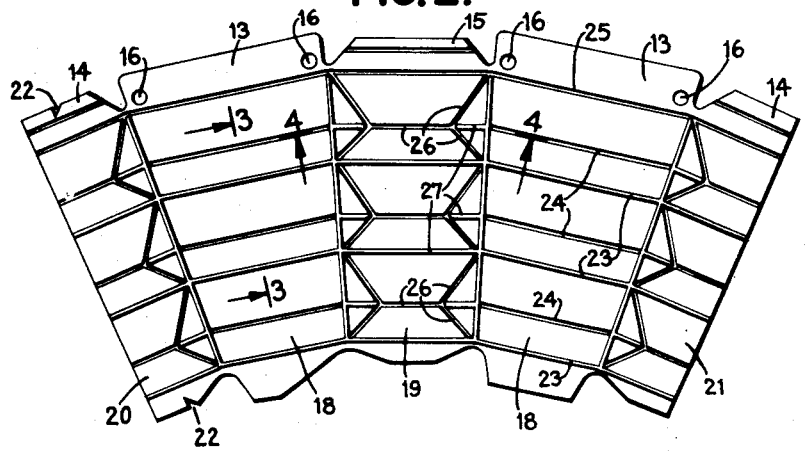
Figure 2 is a plan view of a bellows blank which is ready to be folded into the correct shape.
Figure 3:
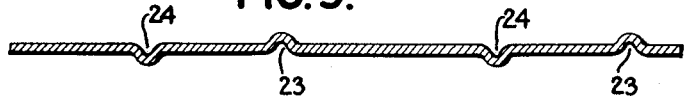
Figure 4:
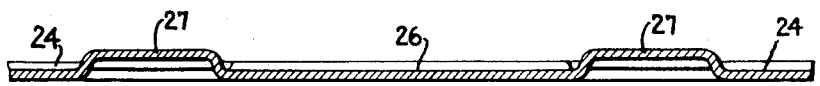

Figures 3 and 4 are cross sections through the blank taken on the lines 3—3 and 4—4, respectively, of Figure 2.

Figure 5:
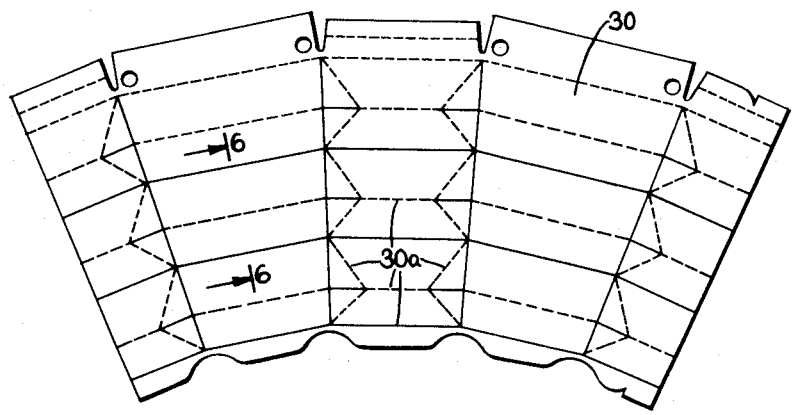

Figure 5 illustrates a blank which is scored by cutting part way through the material.

Figure 6:
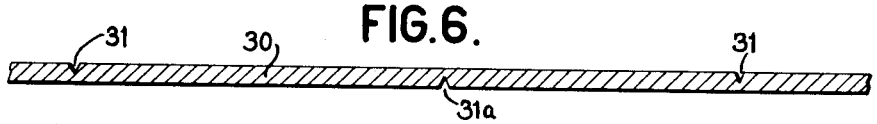

Figure 6 is a cross section of this blank taken on the line 6—6 of Figure 5.

Figure 7:
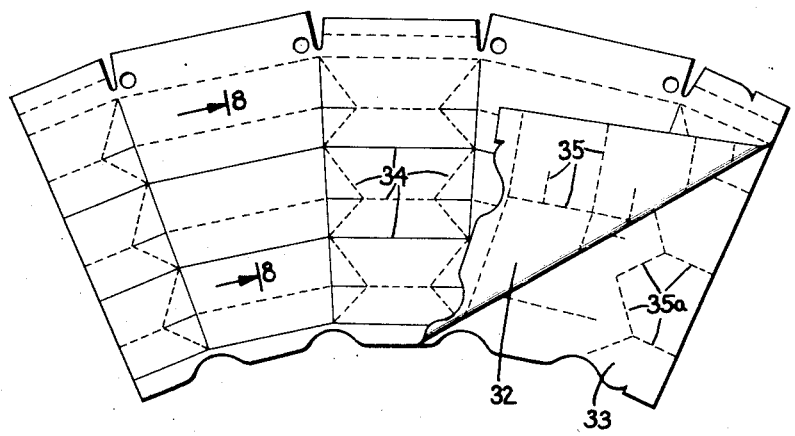

Figure 7 illustrates a further modification of my invention in which the bellows blank is formed from a composite sheet and scored by cutting through one layer.

Figure 8:
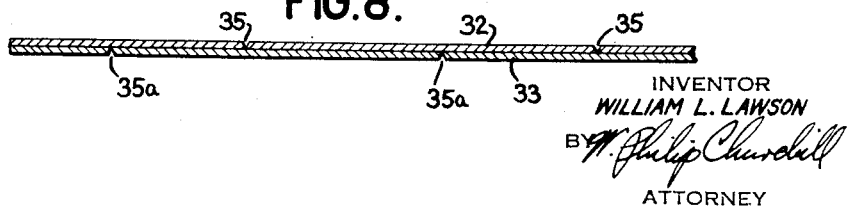

Figure 8 is a cross section of the blank shown in Figure 7 and taken on the lines 8—8.

In the drawings, numeral 10 indicates a collapsible camera bellows, the front end of which is suitably fastened, as by adhesive, to a relatively stiff front member 11. The member 11 may be made of metal, fibre, or cardboard and is provided with an opening 12 for admitting light to photographic film. The rear end of the bellows may be provided with suitable side tabs 13, top tab 14 and bottom tab 15, for attachment to a camera in any desired fashion. Suitable holes 16 may be formed in the tabs, if desired, for facilitating this attachment. This camera bellows is preferably formed from a one piece blank made of a single thickness of material. The ends of the blank may be overlapped at the top (see Figure 1) and pasted together as by a rubber cement or other adhesive. Any other suitable type of joint may be employed, however.

Figure 1:
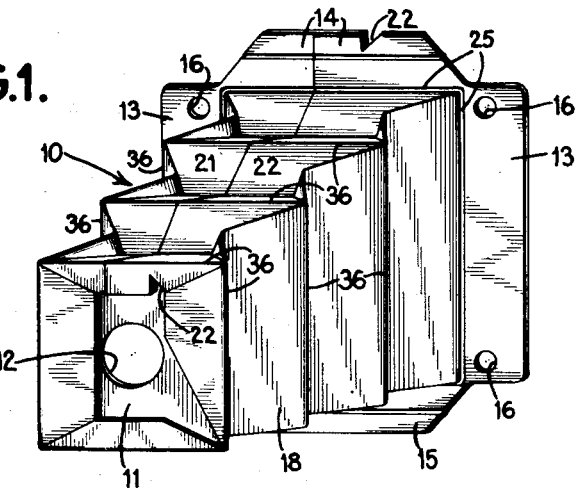
Figure 1 is a perspective view of a camera bellows in a partly opened position.

The bellows blank is preferably formed from a single sheet of material by stamping or the like and scored to form side sections 18, a bottom section 19, and end sections 20 and 21 on each end of the sheet. Section 20 is preferably notched at 22 at both top and bottom so that when folded, the edge of section 21 may be aligned with the notches 22 as illustrated in Figure 1. In scoring the blank, relatively blunt scoring members are preferably employed which make impressions on both sides of the blank. Thus, in the side sections 18, the scoring 23 is impressed on the under surface of the blank and the scoring 24 is impressed on the top surface of the blank. A continuous scoring line 25 may be impressed along the top of the blank so that the various tabs 13, 14 and 15, will all readily fold outwardly. In the top and bottom sections 14 and 15 the scoring 26 is impressed on the upper surface of the blank, while the scoring 27 is impressed on the lower surface of the blank.

Figures 3 and 4 illustrate this alternate scoring for facilitating folding of the blank along the desired lines. With scoring of this type the blank may be most easily folded in the direction of the impressions; that is, the panels on each side of the lines 24, for example, are folded upwardly and the panels on each side of the lines 23 are folded downwardly.

Figures 5 and 6 illustrate a blank 30 which is adapted to form a bellows, in accordance with my invention, in which the scoring 30a is all formed by cutting part way through the blanks of the material to leave relatively deep cuts or grooves 31 on the upper surface and grooves 31a on the under surface of the blank. Blanks scored in this manner are preferably folded away from the cuts; that is, in such a manner as to open and expose the cut portions.

Another bellows blank is illustrated in Figures 7 and 8, which is formed from a composite sheet made up of two layers 32 and 33 of my new camera bellows material. These sheets may be bound together by adhesive or in any other suitable manner. A blank may be readily cut from such a composite sheet and scored by cutting on alternate sides along the lines 34, leaving grooves 35 and 35a.

One important advantage of making bellows in accordance with my invention is the reduction in wall thickness that is possible. In fact, my improved bellows may be made with walls as thin as 0.008 inch and still stand up under very exacting conditions of usage. My invention, however, is not limited to thin-walled bellows or to bellows made from a single thickness of material since varying thicknesses of material may be employed depending on the service requirements. If desired, composite sheets may be also used as long as at least one layer comprises a sheet of my improved bellows material. Thus, paper or other material may be employed as a utility and/or decorative layer. The cut scoring is particularly useful when the bellows is formed from relatively thick material, while the impression scoring is preferable with thinner material.

Bellows blanks illustrated in the drawings may be folded as shown in Figure 1 with one pair of opposed side walls 18 formed by plain, alternately folded panels. The other two side walls are formed with panels folded to cooperate therewith so that the outwardly extending edges 36 produced by folding are connected together to form a series of rectangles of varying sizes. The bellows may, of course, be folded in any desirable manner or configuration.

The material for my improved bellows may be produced from any suitable base of fibrous material bound together with a cementitious agent. In such a base the fibres may be woven, although non-woven fibres such as paper, felts, battings and the like are superior in most respects. Various cementitious materials may be used as a binding agent for the fibres including latex, rubber cements, glue-glycerine mixtures, or various rubber substitutes, and the cementitious material may be incorporated with the fibres in any desirable manner. Such a base material is then preferably treated by impregnation to render the same impervious to light rays affecting photographic film, to increase the stiffness of the material to the desired degree, to suitably color the material, and to give the same the desired finish. A treatment which has been found to be particularly suitable is to apply a mixture including a finely ground pigment suspended in a water solution of a filler, a stiffening agent, a softening agent, and, if desired, a brightening agent. This material may be applied by dipping, spraying or the like but is preferably swabbed on both surfaces of the base material and allowed to soak in and thoroughly penetrate the basic sheet. One or more treatments of this character may be used and, if desired, subsequent treatments with the same or other fillers and finishing agents may be employed.

If both surfaces are to be of a black finish, bone-black, lamp-black, or the like may be used for the pigment; pigments of other colors may be substituted to produce the desired finish. Stiffening agents such as casein, which also have some filling power are preferably employed. Various treating agents may be used such as Irish moss, gelatin, flour, blood or egg albumen and water soluble shellac. A small amount of alkali may also be necessary in order to render the materials water soluble to at least the extent of a colloidal solution. The shellac, and gelatin tend to brighten the surface and therefore may also be considered as brightening agents. Emulsions of wax, such as canauba wax, soften the material and render the same reasonably pliant.

These several ingredients may be applied in one solution or in separate solutions and to obtain the best results, it is desirable to impregnate the base material, allow the impregnants to penetrate and the water or other solvent to at least partially evaporate, and repeat these steps until the sheet has the desired qualities.

When casein is employed, it is also desirable to use formaldehyde, either in the same solution or in a subsequent treatment, to cure and preserve the casein deposits. By adjusting the proportions of ingredients the resultant surface finish may be readily controlled. For example, increasing the amount of pigment tends to produce a dull finish whereas increasing the amount of casein will produce a lustrous finish. In this finishing treatment, the two sides of the sheet may be treated with solutions having either different proportions or containing different ingredients to give one side a lustrous finish and the other a dull or non-reflective finish.

The base material, finished as described, will ordinarily be sufficiently water-proof for all purposes and, in fact, is unusually resistant to all weathering conditions although various pyroxylin or lacquer finishes may be employed if necessary or desirable. Such additional coatings are in the nature of an extra layer however, and are liable to crack upon repeated flexing of the bellows, so that their value, at most, is questionable.

A preferred material is described by way of example, in which the base material is made up of cotton fibres, such as cotton linters bound together with a rubber cement or latex. The individual fibres are preferably coated and aligned to obtain the best support from the binding agent and to afford the maximum strength to the sheet. This base material is then treated by swabbing the surface with several coats of a water solution containing casein, Irish moss, gelatin, shellac, with a finely ground pigment, such as bone-black, in suspension. The relative contents of pigments and casein in the treating agent are preferably adjusted during this treatment to produce an outer surface having a pleasing luster and an inner surface which is dull and non-reflecting. The treating agent should contain approximately 60% solids and 40% water although this may vary depending on the ingredients used and the number of treatments. Three coating treatments on the outer surface and two treatments of the inner surface have been found to be particularly satisfactory with this type of base material. The first treatment is preferably made with a heavily pigmented solution to serve as a primary filler; the second treatment may be made with a solution which contains more of the binding agent and less pigment, and provides the material with good wearing qualities; if desired a third coat may be employed in which the treating solution contains chiefly binding agents with little or no pigment, together with a seasoning agent such as formaldehyde and a small amount of a material for increasing the flexibility. The sheet material is preferably dried between each of the impregnating treatments at a slow rate to allow the impregnating agents to set properly. Normal drying in air is generally satisfactory for this purpose.

A camera bellows formed of a single thin sheet of such material, was subjected to the following test:—The bellows was subjected to 10,000 flexes, immersed in water for a period of about 2 hours, again flexed 10,000 times, immersed and re-flexed an additional 10,000 times, a total of 30,000 flexes. This was followed by ultra-violet light for six hours, after which the bellows was opened and spread out over a photographic plate under an arc light. Development of the photographic plate indicated that the bellows was still intact and free from all pinholes.

A sheet of material prepared in accordance with my invention is susceptible to various treatments with hot or cold dies and pebbled or grained surfaces may be readily produced if desired.

Many modifications are possible in the practice of my invention and I contemplate the use of more than one thickness of my improved bellows material as well as the use of a single thickness thereof. Bellows of this character are also suitable for uses other than in cameras.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A collapsible camera bellows the walls of which are scored alternately on opposite sides to provide panels adapted to be folded against each other in the fully collapsed position, the walls of said bellows comprising a single thickness of material impervious to light rays affecting photographic film, and being sufficiently tough and elastic to withstand repeated flexing without cracking or developing pinholes while having sufficient stiffness to prevent substantial bending of the panels during collapsing of the bellows, said material comprising fibres coated and bound together by an elastic and adhesive binding agent and impregnated with a filler and a stiffening agent.

2. A collapsible camera bellows scored for folding along predetermined lines when collapsed and having substantially flat panels between said lines, the walls of said bellows comprising a material including fibres coated and bound together by an elastic and adhesive binding agent and impregnated with a stiffening agent and with a filler to render said walls impervious to light rays affecting photographic film.

3. A collapsible camera bellows the walls of which are creased in alternate directions and which comprise sheet material including unwoven fibres coated and bound together with an elastic and adhesive binding agent and impregnated with a stiffening agent, said walls being capable of being creased and flexed along predetermined lines without cracking, impervious to light rays affecting photographic film, and resistant to moisture and weathering conditions.

4. A collapsible camera bellows having walls consisting of a single thickness of material impervious to light rays and scored alternately on opposite sides for folding along predetermined lines with panels between said lines, said walls comprising fibres intermingled with and bound together by an elastic and adhesive binding agent and impregnated with filler and a stiffening agent, said walls being sufficiently tough and elastic to withstand repeated flexing along the scored lines without cracking, and said panels being unreinforced but having sufficient stiffness to prevent substantial bending when the bellows is collapsed.

5. A collapsible camera bellows having walls comprising unwoven cotton fibres coated and bound together by a rubber cement and being impregnated with pigment and casein.

6. A camera bellows as defined in claim 2 in which the material of the walls is impregnated with casein, and is capable of retaining a surface finish when treated with dies.

WILLIAM L. LAWSON.